Aug. 8, 1967  L. E. LEFEVRE  3,334,382
EXTRUSION ADAPTER
Filed Aug. 30, 1965
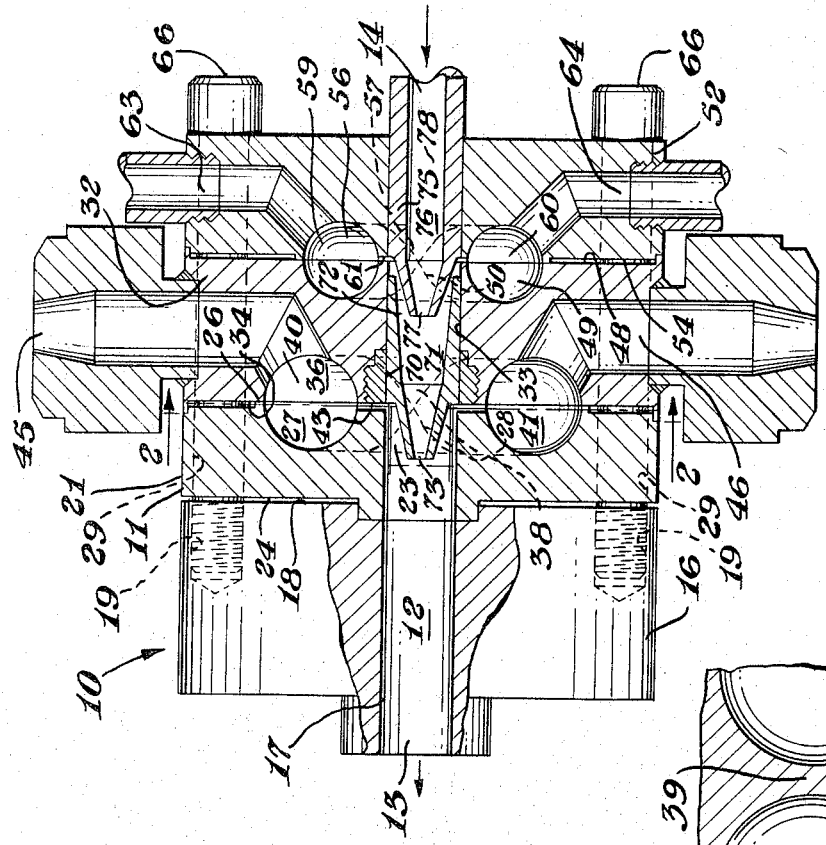
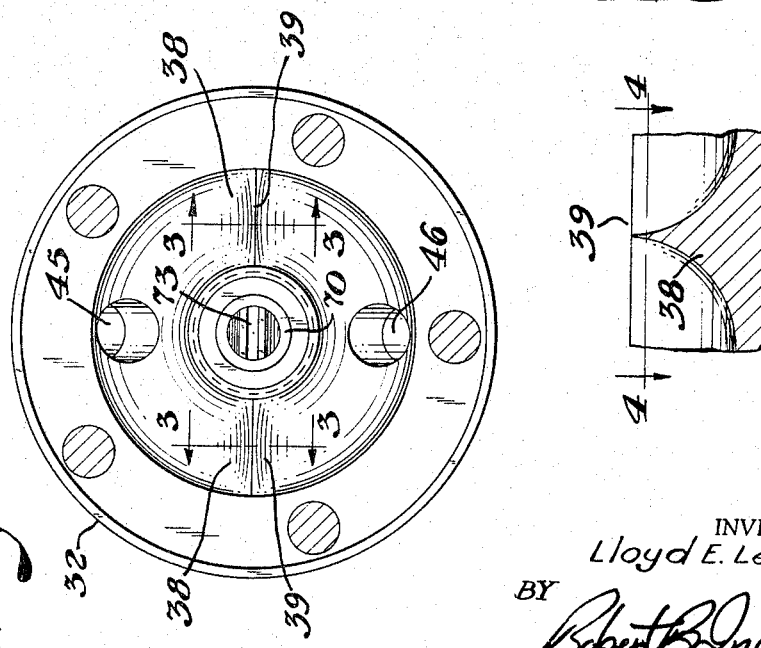
INVENTOR.
Lloyd E. Lefevre
BY
Robert B. Ingraham
AGENT United States Patent Office 3,334,382
Patented Aug. 8, 1967

3,334,382
EXTRUSION ADAPTER
Lloyd E. Lefevre, Bay City, Mich., assignor to The Dow Chemical Company, Midland, Mich., a corporation of Delaware
Filed Aug. 30, 1965, Ser. No. 483,741
7 Claims. (Cl. 18—13)

This invention relates to an extrusion adapter and more particularly relates to an extrusion adapter particularly suited to be interposed between at least first, second and third extruders and a sheeting die to provide multi-layer film.

It is known from British Patent No. 985,310 that multilayer film may be provided by the co-extrusion or simultaneous extrusion of two or more diverse thermoplastic resinous materials and prepared in sheet form by utilizing what, in effect, is a sheeting die disposed within a sheeting die. British Patent 985,310 discloses an apparatus which distributes two streams of plastic material from different plastic extruders uniformly over the width of a first slot die containing therein a second slot die. The apparatus of the British patent provides an apparatus suitable for the preparation of a three-layer film wherein the outer layers are of like or different compositions.

In the preparation of dies for the extrusion of film or sheet, the strength of the die must be sufficient to resist the internal pressure caused by the highly viscous thermoplastic material being discharged therefrom. Therefore, relatively heavy or massive construction must be employed if reasonable uniformity of the layers is to be obtained and permanent distortion of the dies is to be avoided. Certain difficulties exist when utilizing a die-within-a-die concept. Theoretically, the inner die or dies can be constructed from relatively light weight material as a portion of the internal pressure is counterbalanced by the pressure of the material within the outer die. However, in practice, it is frequently difficult to assure such extrusion pressures will be maintained in their proper relationship and below a pressure which would cause either distortion of the die sufficient to cause damage thereto or distortion of the die sufficient to cause an undesirable alteration or nonuniformity in the thickness of the layers of film. For example, if extrusion pressure is lost by the extruder supplying the outer layers, the pressure drop appearing across the inner die is significantly increased. Furthermore, it is undesirable to provide a slot extrusion die for each component or layer within the desired film. By supplying a multi-component heat-plastified stream to a sheeting die, a multi-layer film may be obtained, thus requiring only one slot or sheeting die to produce a film having several layers. For example, a stream having a circular external configuration and having generally centrally encapsulated therein a second heat-plastified synthetic resinous material will produce a three-layer stream when passed to the sheeting die.

It would be beneficial if there were available an improved extrusion adapter or means for the preparation of composite synthetic resinous streams having a desirable configuration to produce a multi-layer film when extruded from a single slot sheeting die.

It would be beneficial if such an extrusion adapter could be used to produce film having varied compositions.

These benefits and other advantages in accordance with the present invention are achieved in an extrusion adapter suited to be interposed between three or more sources of heat-plastified synthetic resinous material and a sheeting die, the extrusion adapter comprising a housing, the housing defining a generally centrally disposed stream passageway having a discharge end adapted to communicate with a sheeting die and an entrance end adapted to receive heat-plastified synthetic resinous material from a first supply source, the housing defining at least one generally annular plenum, second and third polymer supply passageways in communication with the plenum, the second and third polymer passageways being adapted to be in communication with second and third supply means, the housing defining a generally annular passageway providing communication between the stream passageway and the annular plenum, the improvement which comprises at least two dams disposed within the annular plenum and dividing the plenum into first and second portions, the first portion being in communication with the second polymer supply passageway and the second portion being in communication with the third polymer supply passageway.

Further features and advantages of the present invention will become more apparent from the following specification when taken in connection with the drawing wherein:

FIGURE 1 is a sectional view of an extrusion adapter in accordance with the present invention.

FIGURE 2 is a sectional view of the adapter of FIGURE 1 taken along the line 2—2 of FIGURE 1.

FIGURE 3 is a sectional view of the dam shown in FIGURE 2 taken along the line 3—3 thereof.

FIGURE 4 is a sectional view of the dam of FIGURE 3 taken along the line 4—4.

FIGURE 5 is a schematic representation of the adapter of FIGURE 1 in combination with the sheeting die.

In FIGURE 1, there is illustrated an extrusion adapter generally in accordance with the present invention designated by the reference numeral 10. The extrusion adapter 10 comprises a housing generally indicated by the reference numeral 11. The housing 11 has defined therein a generally centrally disposed polymer passageway 12 having a discharge end 13 and a polymer inlet end 14. The discharge end 13 is adapted to communicate with a slot extrusion die, not shown, and the inlet end 14 is adapted to connect to a source of heat-plastified synthetic thermoplastic resinous material such as an extruder. The housing 11 comprises a body portion nosepiece 16 having defined therein a generally centrally disposed cavity 17 which forms a portion of the passageway 12. The body portion 16 defines a generally radially outwardly extending face 18 remote from the discharge portion 13 of the passageway 12. The body portion 16 defines a plurality of internally threaded cavities 19 each adapted to receive a bolt. A second body portion 21 defines an internal passageway 23 which forms a portion of the passageway 12. The body portion 21 has a generally radially extending face 24 which is in sealing engagement with a portion of the radially extending face 18 of the body portion 16. The body portion 21 has a second generally radially extending face 26 remotely disposed from the face 24. A generally annular cavity 27 is defined within the face 26. The cavity 27 is generally axially disposed with relationship to the passageway 23. The body portion 21 defines a pair of dam portions 28, one shown. The dam portions 28 are generally diametrically opposed to each other. The body portion 21 defines a plurality of bolt holes or passages 29 generally adjacent the perimeter thereof. A third body portion 32 is disposed adjacent the second body portion 21. The body portion 32 defines an internal passageway 33 generally coaxially disposed with relationship to the passageways 17 and 23 and forming a portion of the passage 12. The third body portion 32 defines a generally radially extending surface 34 disposed adjacent the surface 26 of the second body portion 21. Within the surface 34 is defined a generally annular cavity 36, generally coaxially disposed with relationship to the passageway 33. The third body portion 32 defines a pair of generally diametrically disposed dam portions 38, one shown, within the annular recess 36. The annular recesses 27 and 36 and the dam portions 28 and 38 define a first hemi-toroidal plenum 40 and a second hemi-toroidal plenum 41. The surfaces 26 and 34 of the body portions 21 and 32 define a generally annular passageway 43 providing radial communication between the hemi-toroidal plenums 40 and 41 and the centrally disposed passageway 13. The third body portion 32 defines a second polymer passageway 45 which is in communication with the plenum 40 and adapted to communicate with a source of heat-plastified thermoplastic resinous material (not shown). The third body portion 32 defines a third polymer passageway 46 communicating with the hemi-toroidal plenum 41 and adapted to communicate with a third source of heat-plastified synthetic resinous material, not shown. A generally radially extending surface 48 is defined by the third body portion 32 and is remotely disposed from the surface 34. The surface 48 defines a generally annular groove or recess 49 which is coaxially disposed with relationship to the passageway 33. The third body portion 32 defines a pair of dam portions 50, one shown, generally diametrically opposed from each other and terminating in an edge 51. A fourth body portion 52 is disposed adjacent the third body portion 32. The fourth body portion 52 defines a generally radially extending surface 54 which is in sealing engagement with a portion of the surface 48 of the third body portion 32. The surface 54 has defined therein a generally annular recess 56. The body portion 52 defines within the annular recess a pair of generally diametrically opposed dams 57, one shown. The annular recesses 56 and 49 cooperate to form a pair of generally hemi-toroidal plenums 59 and 60 which are separated by means of the dams 50 and 57. The body portion 52 defines a fourth polymer passageway 63 which is in communication with the hemi-toroidal passageway 59 and adapted to communicate with a fourth polymer source, not shown. The first, second, third and fourth body portions 16, 21, 32 and 52, respectively, are maintained in sealing relationship to each other by means of a plurality of bolts 66 engaging the internally threaded cavities 19 of the first body portion 16.

The surfaces 48 and 54 between the hemi-toroidal plenums 59 and 60 define a generally annular passageway 61 which provides communication between the hemi-toroidal plenums 59 and 60 and the passageway 12. A bushing 70 is disposed within the passageway 12 generally adjacent the annular passageway 43. The bushing 70 has an internal passageway 71 having an inlet end 72 and an outlet end 73. The outlet end 73 of the bushing 70 has a generally elongate or rectangular configuration. The inlet end of the bushing 70 has a generally circular configuration. A second bushing 75 is disposed within the passageway 12 generally adjacent the annular passageway 61. The bushing 75 defines an internal passageway 76 having a discharge opening 77 and an inlet opening 78. The discharge passageway 77 has a generally elongate or rectangular configuration and the inlet end 78 has a generally circular configuration. The elongate passageways 73 and 77 are disposed in such a manner that their major axes are parallel and generally coincide with an imaginary line joining the diametrically opposed dams 28 and 38 separating the hemi-toroidal plenums 40 and 41 and also generally co-planar with an imaginary line joining the dam portions 50 and 57 dividing the hemi-toroidal plenums 59 and 60.

In FIGURE 2, there is illustrated a sectional view of the die 10 taken along the line 2—2 of FIGURE 1 depicting the relationship of the annular recess 36, the dam portions 38, edges 39 and the passageways 45 and 46 together with the location and orientation of the orifice 73 of the bushing 70 disposed within the central passageway 33.

In FIGURE 3, there is illustrated a sectional view of the dams 38 taken along the line 3—3 of FIGURE 2 while FIGURE 4 depicts a cross-sectional view of a portion of the dam 38 taken along the line 4—4 of FIGURE 3. The configuration of the dams 50 and 57 are substantially identical to that illustrated in FIGURES 2 through 4 wherein the individual dam portions positioned in each of the annular recesses cooperate to divide the annular cavities into two separate chambers.

In operation of an extrusion adapter in accordance with the invention such as the adapter 10, the polymer inlet passageway such as the passageways 14, 45, 46, 63 and 64 are placed in operative communication with a source of heat-plastified synthetic thermoplastic resinous material such as individual extruders adapted to deliver a desired thermoplastic resinous material. The discharge end 13 of the passageway 12 is placed in communication with a sheeting die, that is, a die having an internal cavity and a slot-like extrusion orifice generally oppositely disposed to a passageway, wherein the material is discharged from the discharge end 13 in the cavity of the die. Beneficially, for the preparation of layered film, the bushings 70 and 75 are oriented in such a manner that their elongated slots are generally parallel to the slot of the sheeting die. Heat-plastified synthetic resinous thermoplastic material is supplied to the passageways 14, 45, 46, 63 and 64 from appropriate sources. The material entering the inlet end or passageway 14 of the passageway 12 is formed into an elongate or rectangular configuration by the bushing 75. Material entering from the annular passageway 61 which communicates with the hemi-toroidal plenums 59 and 60 encapsulates the stream emerging from the opening or terminal portion 77 of the bushing 75 forming a composite stream wherein the material from the bushing 75 assumes a generally elongate cross-section and is totally encapsulated within material from the plenums 59 and 60. The resultant composite stream is delivered into the bushing 70 which, in turn, shapes it into a generally elongate cross-sectional configuration which issues from the opening 73 of the bushing 70 where it is encapsulated within the material issuing from the annular passageway 43 which is received from the hemi-toroidal plenums 40 and 41.

Thus, the resultant composite stream flowing in the passageway 12 toward the discharge end 13 comprises a central stream having an elongate or rectangular configuration and composed of material entering the passageway 14. This material, in turn, is surrounded by a layer of material having a generally U or channel shaped configuration of material from the plenum 59 while the remainder of the centrally disposed stream is surrounded by a U or channel shaped configuration of material from the hemi-toroidal plenum 60. The three-component central stream, in turn, is encapsulated within a generally cylindrical configuration made up partly from the material issuing from the hemi-toroidal plenum 40 and material from the hemi-toroidal plenum 41. The composite stream on being passed into and out of a sheeting die assumes the configuration of a five-layer film which, if considered with regard to the orientation of the extrusion adapted depicted in FIGURE 1, has an upper or outer layer of material from the plenum 40, a second or intermediate layer of material from the plenum 59, a central or third layer of material from the inlet 14 of the passageway 12, a fourth or intermediate layer of material from the plenum 60 and a fifth or outer layer of material from the plenum 41. The thickness of layers within the resultant film is readily controlled by the relative feed rates to the various supply ports of the extrusion adapter. For example, if a symmetrical film is desired having a relatively thick inner layer, the feed rate of material to the entrance 14 would be maintained high while the feed rates to plenums 59 and 60 would be maintained equal, but at a lower rate. Similarly, the feed rates to the plenums 40 and 41 would be maintained equal and at a relatively low rate. Thus, the resultant film or sheet would comprise two thin outer layers and a relatively thick inner layer. By adjusting the relative flow rates, thicker or thinner inner or outer layers are readily achieved, the thickness of a particular layer being generally proportional to the feed rate of material to the corresponding feed port.

Alternatively, if desired, multi-color film or sheet is readily prepared utilizing the adapter in accordance with the invention wherein the elongate openings of the bushing are disposed generally normal to the plane of the extruding orifice resulting in the extrusion of a sheet having three centrally disposed stripes when an adapter having the configuration illustrated in FIGURE 1 is employed.

Advantageously, a greater or lesser number of feed streams may be utilized depending upon the particular requirement of the final product. The adapter illustrated has provision for five streams of five different or like components. By adding further body sections or by providing a greater or lesser number of annular plenums, a greater or lesser number of layers are obtainable in the final product. Also, if desired, in one or more of the plenums, the dams may be omitted to provide total encapsulation of the stream by a single component. For example, if it is desired to prepare a sheet or film having a single component on the outer layer, the dams 28 and 50 are removed, the passageways 48 and 45 closed, and material from a continuous toroidal plenum will encapsulate the material issuing from the opening 73 of the bushing 70.

In FIGURE 5 there is schematically illustrated an adapter generally designated by the reference numeral 10a in operative combination with the sheeting die 76. The sheeting die 76 has an extruding orifice 77. The multi-layered sheet 78 is issuing from the orifice 77. The adapter 10a receives heat plastified thermoplastic material from a first extruder 79, a second extruder 80 and a third extruder 81. The adapter 10a is substantially similar in operation to the adapter 10 of FIGURE 1.

Beneficially, the extrusion adapter of the present invention provides a ready and easy means of producing laminate film of a wide variety of structures which is readily varied by alteration of the feed rates to the various passageways and permits the direct preparation of laminates of relatively complicated structure without the requirement of initially forming free film or sheet and subsequently combining such components.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In an extrusion adapter suited to be interposed between three or more sources of heat-plastified synthetic resinous material and a sheeting die, the extrusion adapter comprising a housing, the housing defining a generally centrally disposed stream passageway having a discharge end adapted to communicate with a sheeting die, an entrance end adapted to receive heat-plastified synthetic resinous material from a first supply source, the housing defining at least one generally annular plenum, second and third polymer supply passageways in communication with the plenum, the second and third polymer passageways being adapted to be in communication with second and third supply means, the housing defining a generally annular passageway providing communication between the stream passageway and the annular plenum, the annular passageway permitting radial inward extrusion of a synthetic resinous material, the improvement which comprises at least two dams disposed within the annular plenum and dividing the plenum into first and second portions, the first portion being in communication with the second polymer supply passageway and the second portion being in communication with the third polymer supply passageway.

2. The extrusion adapter of claim 1 wherein the dams are generally diametrically opposed.

3. The adapter of claim 1 wherein the second and third passageways enter the first and second portions of the annular plenum at locations which are generally diametrically opposed.

4. The adapter of claim 1 wherein a bushing is disposed within the stream passageway, the bushing defining a passageway which provides communication between the discharge end and the entrance end of the stream passageway, the bushing terminating in a generally elongated orifice at a location disposed between the annular passageway and the discharge end of the stream passageway, the bushing and the housing so constructed and arranged to permit flow of thermoplastic material from the annular passageway about the bushing and permitting the thermoplastic material from the annular passageway to encapsulate a stream of thermoplastic material issuing from the generally elongated orifice of the bushing.

5. The adapter of claim 4 wherein the dams are disposed generally in a plane containing the axis of the stream passageway and the major axis of the cross-sectional configuration of the elongate bushing opening.

6. The adapter of claim 1 wherein the housing defines a second annular plenum with associated passageways and an annular passageway generally similar in configuration to the structure of claim 1.

7. The adapter of claim 1 wherein the housing has a plurality of body portions and the annular plenums and annular passageways are defined by adjacent body portions.

References Cited

UNITED STATES PATENTS

| 1,637,207 | 7/1927 | Whitehouse. | |
|---|---|---|---|
| 1,978,163 | 10/1934 | Megow | 18—13 X |
| 2,524,829 | 10/1950 | Perzel | 18—13 |
| 2,820,249 | 1/1958 | Colombo | 18—13 |
| 2,977,632 | 4/1961 | Bunch | 18—13 |
| 3,121,255 | 2/1964 | Henning et al. | 18—13 |
| 3,189,941 | 6/1965 | Refernhauser | 18—13 |
| 3,227,103 | 1/1966 | Schafer | 18—13 X |
| 3,241,503 | 3/1966 | Schafer | 18—13 X |

FOREIGN PATENTS

| 520,637 | 6/1953 | Belgium. |
|---|---|---|
| 1,203,657 | 8/1959 | France. |
| 985,310 | 3/1965 | Great Britain. |

WILLIAM J. STEPHENSON, *Primary Examiner.*

J. SPENCER OVERHOLSER, *Examiner.*